Patented May 17, 1927.

1,628,945

UNITED STATES PATENT OFFICE.

ERNEST M. BROGDEN, OF SANTA MONICA, CALIFORNIA, ASSIGNOR TO BROGDEX COMPANY, OF WINTER HAVEN, FLORIDA, A CORPORATION OF FLORIDA.

COMPOSITION FOR TREATING FRUIT AND THE LIKE.

No Drawing. Application filed August 9, 1924. Serial No. 731,207.

This invention relates to compositions for treating fruit and the like; and it relates more particularly to compositions comprising a normally solid protective material, especially a waxy material of substantially neutral character, such as paraffin wax, intimately associated in suitably fluent mixture with an oily vehicle that is also substantially neutral or inert, the mixture being adapted, when properly applied to fresh fruit or the like, to provide the same with a very thin film-like coating effective to suitably seal the surface thereof to such extent and in such manner as to provide protection against infection from external sources, to retard withering or shrinking and loss of flavor for prolonged periods of time, and in general to maintain the fruit or like article sound, plump and fresh.

For the sake of convenience, the term "fruit" is herein used in a broad sense to include both fruits proper and also vegetables, in so far as they can be treated to advantage with the novel compositions of the invention.

In the course of extensive practical work in the protective or preservative treatment of fresh fruit by coating the same with a mixture of paraffin and a liquid vehicle or solvent therefor, I have found it possible to improve materially the mixture or composition with respect to its effect upon the keeping qualities of the fruit and upon the acceptability of the fruit to the trade from the standpoint of appearance, as well as in other important respects, as will hereinafter appear. Whereas a composition in which the entire solvent vehicle is of relatively high volatility, such as gasoline, has heretofore been considered especially advantageous and has in fact been employed to a considerable extent, I have now found that more uniformly dependable results can be had and other practical advantages attained by using a vehicle consisting wholly or in part of a suitable liquid medium characterized by substantially lower volatility than gasoline, provided the composition is otherwise properly constituted and care is taken to ensure that the protective or preservative coating remaining on the fruit as a result of the treatment is of the requisite extreme thinness. It is of importance also that whatever vehicle is employed shall be as nearly neutral and inert as possible in respect to its behavior toward fruit under the conditions of its employment for the purposes stated.

As a result of extensive experimentation in preservative treatment of fresh fruits of various kinds, I have found that the matter of viscosity of the oily vehicle employed is one that in many cases has a very important influence on the character and consequent effectiveness of the protective or preservative coating film produced on the fruit by the methods of application now in use. The viscosity factor manifests itself in at least two ways: first, it materially affects the thickness of the protective film produced on the fruit by the rubbing action of the polisher brushes or other rubbing means employed; and second, it determines in some degree the extent to which the solvent penetrates or is absorbed by the tissues of the fruit skin or rind, thus also necessarily affecting the consistency and other properties of the residual protective film proper. Thus, where a vehicle of too high viscosity is used, even though the waxy composition may have the appearance of being easily spreadable, the brushes may not rub it out on the fruit surface to the thinness requisite for best results. Furthermore such an oil is apt not to penetrate or be absorbed by the fruit rind or skin to the extent normally desirable in the case of citrous fruits especially. On the other hand certain thin-skinned and sensitive grades of fruit may be damaged rather than helped by application thereto of a composition comprising an oil of too low viscosity and correspondingly high penetrative properties. Accordingly the factor of viscosity is a controlling consideration in some, although not all, aspects of the present invention.

Among various oils that are less volatile than gasoline and that are otherwise suitable for the purposes of the present invention, may be mentioned refined mineral oils derived from petroleum. Refined mineral oils of the character herein contemplated may be characterized generally as oils included within the range defined by lubricating oils on the one hand and low-boiling kerosenes on the other, as respective limits. It being understood that oils within this range that are suitable for use in practicing the invention are refined to such an extent as to be without substantial deteriorating or destructive action on the fruit when properly used. Oils included within said range are all substantially non-volatile at ordinary room or atmospheric temperatures and most of them have flash points well above the temperatures prevailing at any stage in the preservative treatment of fruit as herein contemplated. While various mineral oils within the range indicated can be successfully employed in the novel compositions of the invention, refined petroleum oils of the kerosene type have been found to be especially desirable. Ordinary commercial kerosenes can be used, but a kerosene that has been specially refined to eliminate a substantial proportion of its characteristic odor offers special advantages. Among other suitable refined mineral oils may be mentioned those known commercially as "white oils," some of which are used for medicinal purposes. Oils of this character are substantially free from color, taste and odor, and these and other desirable characteristics render them especially advantageous in some instances as components of preservative coating compositions of the character here in question. A good grade of what is known commercially as "paraffine oil" is another type of oil that can sometimes be employed to advantage in the novel coating compositions.

The employment of suitable vegetable or animal oils is not excluded but is more expensive; and furthermore mineral oils are generally preferable because of their normally greater chemical stability and inertness under the conditions of use herein contemplated. Nor is the presence in the composition of a more volatile solvent, such as gasolene or petrolic ether, for example, if in association with a less volatile solvent of the general class above referred to, to be understood as outside the scope of the invention in its broader aspects. The important consideration is that there shall be present in the mixture enough of a solvent less volatile than gasoline to exercise a substantial influence upon the character of the composition, distinguishing it from compositions in which only a relatively volatile solvent is employed.

It is of course important to avoid using oils or other ingredients in the mixture that have a specifically harmful action on fruit. Oils that are undesirable to employ in the novel composition of the invention in its best embodiments may result, for example, from excessive heat treatment and consequent drastic cracking during the refining or distillation of petroleum and its products, a condition which is often evidenced by discoloration; or they may be oils that show substantial mineral acidity as a result of improper treatment after distillation. Such oils should not be used in the treatment of highly sensitive fruit. Generally speaking, the presence of heavy lubricating ends in the oily vehicle is not desirable.

The waxy material included in the novel composition, as well as the oily vehicle, should be practically inert chemically, without harmful action upon fruit or upon the human digestive tract, and most desirably should be substantially free of color, taste and odor. Ordinarily a mineral wax best answers the requirements. Paraffin wax, obtainable commercially in several grades varying in purity and melting point, is especially to be recommended. A highly refined paraffin that is of excellent purity and has a reasonably low melting point, about 118° F., is commercially available and has given particularly good results in practice; and, unless otherwise specified, its use will be understood wherever paraffin is referred to hereinafter. Higher melting and less pure grades of paraffin can be used but are sometimes not so completely satisfactory.

In order to afford a still fuller understanding of the principles of the invention, specific illustrative examples of compositions embodying the same will now be given with the understanding that these are not to be interpreted as restrictive.

In employing kerosene as the oily vehicle or carrier for the waxy constituent of the composition, it is feasible to use ordinary kerosene, as already stated. It is more desirable, however, to use a kerosene that has been more carefully refined than such ordinary kerosenes, and specially refined kerosenes of this character are available commercially. Highly desirable oils of this type may range in typical instances from 42° to 44° Baumé (0.811 to 0.820 specific gravity), but wider variations are of course permissible. A typical oil of this class may have a distillation range of 360° to 486° F., and a flash point of about 149° F. Such an oil is in effect a narrow-cut oil of the kerosene type, highly refined and substantially non-volatile below 150° F. It is substantially water white, practically neutral, and has a relatively faint odor of kerosene.

The relative proportions of waxy material and oils of the kerosene type used in the novel coating compositions may vary within reasonably wide limits depending upon the conditions under which the compositions are to be used. The proportion of paraffin may vary from as little as 10 or 20 per cent to as much as 80 or 90 per cent of the mixture, by volume. Paraffin in the proportion of from about 25 per cent to 75 per cent of the mixture, by volume has also been found to be a good practical working range in some classes of work. Relatively thin mixtures, employing paraffin in minor proportions, are the more satisfactory as a rule in treating citrous fruit, 10 to 20 per cent of paraffin having been found especially desirable where the coating composition is to be sprayed or atomized upon the fruit. In preparing the novel compositions, a convenient procedure is to thoroughly liquefy the paraffin by heating and then add the desired amount of kerosene to the melted paraffin while stirring vigorously. After the mixture has cooled somewhat, it may advantageously be homogenized with the aid of a fairly high speed emulsifier or homogenizer. Compositions properly prepared in this manner are reasonably fluid and readily spreadable in a thin film over the surface of fruit to provide the same with a scarcely perceptible protective coating of extreme thinness. The application of the novel coating compositions to citrous and other fruits is most conveniently effected with the aid of revoluble brush-roll mechanism such, for example, as fruit-polishing apparatus of well-known types modified as may be necessary to supply the coating material in properly regulated quantity to the fruit going through the apparatus. The method of applying the compositions and the apparatus therefor form no part of the invention herein claimed and no specific description thereof is required.

It is sometimes desirable to employ, in place of a single solvent or vehicle, such as an oil of the kerosene type, a blend or mixture of different types of oils having different viscosities. In this way it is possible to adjust accurately the viscosity and other properties of the treating composition as may be advisable to meet given conditions of use. Thus, a thoroughly emulsified mixture containing paraffin together with a vehicle comprising a light mineral oil of the kerosene type and a white mineral oil of greater viscosity is found highly effective for preservatively coating and polishing citrous fruits at ordinary room temperatures. Such a composition may contain, for example, about 30 parts of paraffin, 20 parts of white mineral oil, and 50 parts of a lighter oil of the kerosene type. Still another mixture that works well consists of 35 parts of paraffin wax, 15 parts of white oil, and 50 parts of the lighter oil. In a typical instance the oil used in the foregoing specific example may desirably be a low-viscosity white mineral oil, practically odorless, colorless and tasteless, having a specific gravity of between about .830 and .870 and a relatively narrow distillation range, all of which characteristics render it especially suitable for use as an oily vehicle in the composition described. A typical specimen of such a white oil shows the following characteristics when tested by standard methods:

Specific gravity 0.840 (about 38° Bé.).
Viscosity at 100° F. 70 to 73 sec. Saybolt.
Flash point 340° to 350° F.
Distillation range 600° to 745° F.

A white oil of this general type having a specific gravity of between about .830 to .850 and a viscosity within the approximate range of 50 to 100 seconds Saybolt (at 100° F.) is regarded as a particularly desirable vehicle for general purposes. Speaking generally, it may be stated that the viscosity of white mineral oils suitable for use in the present invention should not ordinarily be less than 50 seconds nor greater than 300 seconds Saybolt (at 100° F.). The minimum viscosity indicated is of course greater than that of light mineral oils of the kerosene type hereinbefore referred to.

It has also been found that the employment of a relatively non-volatile oil in a preservative composition of the general character here in question is distinctly advantageous even where the greater part of the composite oily vehicle is one, like gasoline or petrolic ether, that is relatively volatile at usual atmospheric temperatures. In this case, as in the examples hereinabove given, the nonvolatile oil functions usefully in bettering the character and adherence of the thin waxy coating left on the fruit by the action of the applying and polishing mechanism. If the composition is very thin and fluid, as it may be in the preservative treatment of certain fruits that occur in clusters or bunches, such as bananas and grapes, where rubbing the fruit is not feasible and dipping must be resorted to, the presence of even as little as 3 to 5 per cent by volume of a relatively non-volatile oil, such as a white mineral oil, in the mixture or solution of paraffin and volatile solvent is effective to prevent the paraffin from being deposited in crystals or similar particles on the surface of the fruit upon evaporation of the volatile solvent. Moreover, the character of the film-like residual coating of paraffin on the dipped fruit is favorably influenced by the presence of the nonvolatile oil therein.

While certain harmless ingredients other than the waxy material and the oily solvent vehicle may be incorporated for particular purposes in the various forms of the novel composition hereinabove described, without departing from the invention in its broader aspects, such additional ingredients are not usually necessary and should in any case be employed with caution in view of the remarkable sensitiveness of many fruits to various agents that are ordinarily classed as innocuous. For example, the novel compositions, especially the paraffin-kerosene mixtures, may sometimes advantageously contain also a suitable proportion of finely divided solid matter of harmless character that may serve, among other things, to facilitate evaporation of the solvent to the extent desired. Ordinary dry cooking starch is a substance that may be used for this purpose, and it has the additional effect of improving the polish obtained on the fruit. Paraffin oil may also be sometimes used to advantage in small proportions in the mixture where starch is employed. The amount of starch used may vary in accordance with the consistency and other properties desired for the mixture. In some cases the mixture may advantageously be proportioned in such manner that the starch is used in volume equal to or greater than the volume of the oily vehicle, such as kerosene, while the volume of the paraffin used does not substantially exceed the volume of such oily vehicle.

Generally speaking the various embodiments of the novel composition hereinabove described are adapted more particularly for the preservative treatment of fruit and this use has therefore been emphasized in the foregoing description; but it is not intended thereby to restrict the employment of the composition to that field only.

This application is a consolidation of matter divided out of prior copending applications of this applicant, Serial No. 542,141, filed March 8, 1922, and Serial No. 615,741, filed January 29, 1923.

What is claimed is:

1. As a new article of manufacture, a composition useful especially for preservatively coating fruit and the like which comprises a waxy material and a liquid vehicle consisting principally of kerosene, mixed together in such proportions that it can be spread on fruit to produce a film coating of paraffin thereon, said composition being free of ingredients harmful to fruit.

2. As a new article of manufacture, a preservative composition for coating fruit comprising paraffin and a liquid vehicle consisting principally of kerosene, mixed together in such proportions that it can be spread on fruit to produce a film coating of paraffin thereon, said composition being free of ingredients harmful to fruit.

3. As a new article of manufacture, a composition useful especially for preservatively coating fruit and the like which comprises paraffin blended with a mineral oil vehicle comprising principally an oil of the kerosene type, the proportion of paraffin in the mixture being between about 10 per cent and about 80 to 90 per cent.

4. As a new article of manufacture, a composition useful especially for preservatively coating fruit and the like which comprises waxy material blended with a mineral oil vehicle comprising principally an oil of the kerosene type from which the odor has been largely eliminated, said oil having a specific gravity of approximately .810 to .820 and a comparatively narrow distillation range.

5. As a new article of manufacture, a preservative composition for coating fruit comprising a mixture of paraffin and a liquid vehicle consisting principally of kerosene, the paraffin constituting from about 25 per cent to 75 per cent of the mixture, by volume.

6. As a new article of manufacture, a composition useful especially for preservatively coating fruit and the like which comprises a waxy material and a refined mineral oil that is substantially non-volatile below 150° F., mixed together in such proportions that it can be spread on fruit to produce a film coating of waxy material thereon.

7. As a new article of manufacture, a composition useful especially for preservatively coating fruit and the like which comprises a waxy material blended with a composite oily vehicle comprising a white mineral oil and a lighter oil of the kerosene type.

8. As a new article of manufacture, a composition useful especially for preservatively coating fruit and the like which comprises approximately 30 to 35 parts of paraffin, 20 to 15 parts of white mineral oil, and 50 parts of a lighter oil of the kerosene type, all intimately commingled.

9. A preservative composition for coating fruit comprising an intimate mixture of waxy material, finely divided solid matter, and kerosene, said mixture being spreadable on fruit to provide a film coating therefor.

10. A preservative composition for coating fruit comprising an intimate mixture of paraffin, starch, and kerosene, said mixture being spreadable on fruit to provide a film coating therefor.

11. A preservative composition for coating fruit comprising intimately commingled paraffin, starch and kerosene, the starch being employed in volume substantially equal to or greater than the volume of kerosene, and the paraffin being employed in volume not substantially greater than the volume of kerosene.

In testimony whereof I hereunto affix my signature.

ERNEST M. BROGDEN.